United States Patent Office
2,998,311
Patented Aug. 29, 1961

2,998,311
PROCESSING NICKEL-CONTAINING LATERITIC ORES
Alexander Illis, Copper Cliff, Ontario, Canada, and Paul Etienne Queneau, Fairfield, Conn., assignors to The International Nickel Company, Inc., New York, N.Y., a corporation of Delaware
No Drawing. Filed Aug. 25, 1958, Ser. No. 757,110
6 Claims. (Cl. 75—82)

The present invention relates to a process for recovering nickel, cobalt and iron from nickeliferous oxide ores and, more particularly, to an improved process of extracting nickel, cobalt and iron from lateritic nickel ores of relatively low magnesia content. These ores may be found in such countries as Brazil, Cuba, Dominican Republic, New Caledonia, and the Philippine Islands. For the purpose of broad generalization within the scope of this invention, these ores may be considered to contain less than about 10% magnesia and, in most cases, more than about 35% iron.

Numerous proposals have been disclosed for the extraction of nickel and cobalt from lateritic nickel ores including direct acid leaching of the raw ore, smelting to ferro-nickel, sulfating, chloridizing, and, after preliminary reduction, leaching with acid or ammoniacal solutions or extraction with carbon monoxide. Most of these proposals suffer from unduly high cost or from unduly low nickel and cobalt extraction or from complexity of operations in the recovery of nickel, cobalt and iron of desired purity.

It has now been discovered that very high extraction of both the nickel content and the cobalt content and a small, controlled proportion of the iron content of lateritic nickel ores, particularly ores of the iron oxide type, can be obtained by selective gaseous reduction of the nickel, cobalt, and a part of the iron of the ore at elevated temperature followed by a three-stage, relatively low temperature gaseous treatment followed by a simple water leach. This procedure yields a final residue from such ores rich in iron and containing as little as 0.02% nickel and 0.01% cobalt.

It is an object of the present invention to provide an improved process for recovering nickel, cobalt and iron from lateritic nickel ores of low magnesia content.

Another object of the invention is to provide an improved process for treatment of lateritic nickel ores of relatively high iron and low magnesia content to recover directly most of the nickel and a small part of the iron as metals of high purity.

A further object of the invention is to provide a process which will ease the difficult treatment problem presented by lateritic nickel ores in respect to separation from each other of the extracted nickel, cobalt and iron An additional object of the invention is to provide a practical and economic process for treatment of lateritic nickel ores of the iron oxide type for the substantially complete elimination of their nickel and cobalt contents to yield an iron rich residue suitable for steel production.

Other objects and advantages will become apparent from the following description.

Generally speaking, the present invention contemplates the treatment of lateritic ores containing substantial quantities of nickel and cobalt, e.g., about one percent to two percent nickel and about one-tenth as much cobalt, to obtain a high recovery of these metals by a novel extraction procedure. The process comprises the steps of gaseous reduction at elevated temperature of the nickel and cobalt to metal selectively with respect to iron, cooling the reduced material in a non-oxidizing atmosphere, and treating the reduced, cooled and dry ore with carbon monoxide in a volatilizer at about atmospheric pressure to volatilize most of the nickel in the reduced material as nickel carbonyl together with a controlled proportion of the iron in the ore as iron carbonyl. The volatilizer residue from the carbon monoxide extraction step is then treated with chlorine, then with an oxidizing gas containing free oxygen and finally with water. The chlorination, oxidizing gas treatment and aqueous leaching operations comprise selectively chloridizing nickel and cobalt by a dry chlorine gas addition followed by a heat treatment, which may be autogenous, of the chloridized material by an addition of an oxidizing gas containing free oxygen, for example, air, to decompose iron chlorides and then water leaching to dissolve the soluble nickel and cobalt values. The nickel and cobalt remaining in the residue from the carbonyl volatilization operation may be extracted by leaching with chlorine water but this results in undue reagent consumption. The pregnant solution obtained from the leaching operation may be treated in any desired manner, such as by subjecting it to a sulfide precipitation step, e.g., using sodium sulfide or hydrogen sulfide, to precipitate both nickel and cobalt as sulfides which, after filtration, drying and melting, may be cast into anodes and electrolyzed to yield pure electro-nickel, electro-cobalt and sulfur as disclosed in the Renzoni et al. U.S. Patent No. 2,839,461 granted June 17, 1958.

The selective reduction of the ore is accomplished by heating the ore to an elevated temperature in a selectively reducing atmosphere and regulating the temperature and time of the reduction and the reducing power of the atmosphere to obtain most of the nickel in a state amenable to direct extraction by carbon monoxide gas and the remaining nickel and the cobalt in a state highly reactive to dry chlorine gas subsequent to the carbon monoxide treatment. In the selective reduction operation, the ore may advantageously be reduced within the range of about 930° F. to about 1200° F., although reduction temperatures up to about 1500° F. may be used, particularly for ores having a relatively low content of both magnesia and iron, e.g., less than about 10% magnesia and less than about 35% iron.

Since formation of the carbonyls and chlorides are relatively low temperature gas-solid reactions, it is essential to have the metals in an active state, with high surface area, to obtain high and rapid metal extractions. If the selective reduction is carried out above about 1500° F., the nickel-iron alloy formed is relatively inactive and leads to a decrease in both rate and extent of nickel extraction. Although selective reduction at below 930° F. may yield highly active metal, the rate and extent of oxide reduction is unduly low.

The reduction operation is advantageously conducted in an atmosphere containing carbon monoxide, carbon dioxide, hydrogen and water vapor having an equilibrium reducing potential at final reaction temperature which may be expressed as ratio of carbon monoxide to carbon dioxide of not more than about 3:2 and not less than about 1:3 or the equivalent thereof in ratio of hydrogen to water vapor. The gas ratio is based on the proportions of carbon monoxide to carbon dioxide in the atmosphere practicably in equlibrium with the hot ore at the final reaction temperature. It is necessary to employ a reducing atmosphere having a reducing potential which may be expressed by the foregoing carbon monoxide to carbon dioxide ratio to extract most of the nickel in the ore as carbonyl and a significant amount of the iron in the ore as carbonyl which together with subsequent operations permits recovery of up to about 99% of the ore's nickel content and up to about 95% of the ore's cobalt content.

Employing a reducing atmosphere having an equilibrium reducing potential at final reaction temperature corresponding to a higher ratio of carbon monoxide to carbon dioxide than 3:2 yields a relatively inactive ferronickel rich in iron with resulting detriment to nickel and cobalt extraction by our carbon monoxide-chlorine process. On the other hand, the use of an atmosphere having an equilibrium reducing potential corresponding to a lower ratio of carbon monoxide to carbon dioxide than 1:3 results in a decrease in rate and extent of reduction of nickel and cobalt to metal which is necessary for the subsequent high recoveries contemplated by this invention.

The selective reduction procedure of this invention enables the carbonyl extraction operation to volatilize up to about 90% of the ore's nickel content together with a significant amount of the iron content. The iron reduced to the metallic state is not less than about one percent but less than about 15% of the iron content of the ore. If a larger proportion of iron is reduced to the metallic state, nickel volatilization as carbonyl from the iron-rich alloy becomes difficult and the proportion of metallic nickel obtainable by this means is decreased and undesirable iron chloride formation increased. If the proportion of iron reduced to the metallic state is less than about one percent, it is virtually impossible to attain the high degree of nickel and cobalt reduction necessary for the subsequent high nickel and cobalt extractions.

The selectively reduced material is cooled in an oxygen-free atmosphere, such as partially spent reduction gas, to below 200° F.

The substantially dry, cooled, selectively-reduced ore is treated in a volatilizer with carbon monoxide at about atmospheric pressure and at a temperature not less than about 100° F. and not more than about 200° F. to volatilize substantially all of the nickel in the material as nickel carbonyl together with a controlled proportion of the iron in the material as iron carbonyl such that the ratio of iron to nickel in the volatilized carbonyls is not less than about 1:7 and not more than about 2:1. This carbonyl extraction of the major part of the ore's nickel content with co-removal of metallic iron improves the subsequent nickel and cobalt extraction by chlorination procedures for the following reasons:

(1) Cobalt and residual nickel become more reactive to chlorine because in the course of the extraction of nickel and iron as carbonyls the porosity or permeability of the ore particles, i.e., the surface area exposed to gas-solid contact, is increased.

(2) The pregnant solution obtained by chlorination and water leaching of the carbonyl-extracted ore contains a much lower nickel to cobalt ratio than that of the original ore. This provides a distinct advantage in subsequent separation to obtain pure cobalt.

(3) Since only a minor proportion of the nickel content of the ore is involved in the leaching operation, removal of nickel and cobalt from pregnant solution by chemical precipitation as sulfides, e.g., by sodium sulfide or hydrogen sulfide, is economically practicable. Furthermore, for the same reason, expensive chlorine regeneration is not necessary.

(4) Volatilization of a major part of the metallic iron as carbonyl results in a decrease of chlorine consumption and ultimately enhances recovery of nickel and cobalt from the aqueous leach solution.

The mixed carbonyls of nickel and iron may be separated in any desired manner, e.g., by liquefaction and fractionation, and then the separated carbonyls decomposed to yield high purity metallic nickel and high purity metallic iron.

The residue from the foregoing carbonyl extraction operation, i.e., the volatilizer solids discharge, is further processed to extract cobalt and residual nickel which operation, as noted hereinbefore, comprises simply a low temperature treatment with dry chlorine gas followed by an autogenous heat treatment with air and a water leach as described more fully hereinafter.

The volatilizer solids discharge is treated in a solubilizer with chlorine at about atmospheric pressure and at a temperature of not less than about 100° F. and not more than about 200° F., and at an addition rate of from about 5 to about 50 pounds of dry chlorine gas per ton of solids to convert residual nickel and the cobalt to chlorides. This reaction is usually rapidly completed in less than 30 minutes. Due to the extremely active state of the residual nickel and the cobalt after the carbonyl extraction operation, the foregoing temperature range and time interval are adequate for complete chlorination of the cobalt and the nickel. If the treatment with dry chlorine gas is carried out at substantially higher temperature than specified, the iron oxides, wustite and magnetite, will undesirably consume chlorine. Operating at substantially lower temperature than specified slows the reaction rate and may require refrigeration with its attendant obvious disadvantages.

Surprisingly, the volatilization by carbon monoxide of nickel and iron as carbonyls and the water solubilization by chlorine of nickel and cobalt are both conducted in the same temperature range. This absence of thermal differential facilitates the overall process.

After the foregoing treatment of the volatilizer solids discharge with dry chlorine gas, air is substituted for chlorine and the material is heated in air at a temperature between about 200° F. and about 500° F. at atmospheric pressure for up to about 60 minutes to decompose iron chlorides. Air addition must be judiciously controlled because some of the iron oxides are pyrophoric and tend to cause high localized temperatures resulting in decreased subsequent nickel and cobalt extractions. It is therefore preferred to initially admit air containing less than normal oxygen content, e.g., by inert gas dilution and gradually increasing to normal oxygen content or even higher, e.g., by oxygen addition.

The chloridized and heat treated material is then leached with water to extract its nickel and cobalt content.

The foregoing chain of simple operations extract up to 99% of the nickel content of the ore as carbonyl and chloride, up to 95% of its cobalt content as chloride and a significant percentage of its iron content as carbonyl.

For the purpose of giving those skilled in the art a better appreciation of the advantages of the invention, the following illustrative example is given:

*Example I*

A lateritic nickel ore of the iron oxide type containing 1.07% nickel, 0.14% cobalt and 50% iron was ground to 6% plus 200 mesh, mixed with 0.05% pyrite and selectively reduced at a temperature of 1200° F. for 2 hours in an atmosphere containing carbon monoxide, carbon dioxide, hydrogen and water vapor and having a ratio of carbon monoxide to carbon dioxide of 1 to 1.5 at the above temperature. The selectively reduced ore was cooled to 120° F. in a non-oxidizing atmosphere and treated in a carbonyl volatilizer at atmospheric pressure with gas containing 92% carbon monoxide. This operation rapidly extracted 76% of the nickel content of the ore without cobalt volatilization together with 1.7% of the iron content of the ore as mixed carbonyls having an iron to nickel ratio of 1:1. The solids from the volatilizer were treated with dry chlorine gas at the rate of 20 pounds of chlorine per ton of solids, at 120° F. for 10 minutes, air then was substituted for chlorine and the temperature of the charge was raised to 300° F. for 30 minutes. The chloridized material was then leached in water at 75° F. The final leached residue contained 0.02% nickel and 0.01% cobalt, corresponding to an overall extraction of 99% of the nickel content of the ore, 95% of its cobalt content and 2% of its iron content.

It is to be observed that the present invention provides a process for recovering nickel from finely divided selectively reduced lateritic nickel and cobalt-bearing ore, by its sequential treatment with carbon monoxide, chlorine, air and water, which comprises reducing the ore by heating it to an elevated temperature in a selectively reducing atmosphere, treating the so reduced ore with carbon monoxide to volatilize most of the volatilizable nickel and a controlled small proportion of iron, treating the volatilizer solids discharge with dry chlorine to convert the remaining nickel and the cobalt to the water soluble state, heating the product in air to decompose iron chlorides and then water leaching to remove the remaining nickel and the cobalt. The material being treated by the present invention may be conditioned for promotion of nickel volatilization by carbon monoxide by treatment with a controlled amount of a sulfur-containing substance such as sulfur or pyrite or hydrogen sulfide.

Although the present invention has been described in conjunction with preferred embodiments, it is to be understood that modifications and variations may be resorted to without departing from the spirit and scope of the invention as those skilled in the art will readily understand. For instance, elevated rather than atmospheric pressure can be used in treatment of the selectively reduced ore with carbon monoxide so as to increase reaction rate. This obvious variation is usually not economically advantageous due to the accompanying increase in cost of equipment required to safely handle the large tonnages of material, only a small fraction of which is to be volatilized. Such modifications and variations are considered to be within the purview and scope of the invention and the appended claims.

We claim:

1. A process for recovering nickel, cobalt and a controlled proportion of iron from lateritic nickel- and cobalt-bearing ores of the iron oxide type which comprises reducing the ore at a temperature within the range of about 930° F. to about 1500° F. in a selectively reducing atmosphere containing reducing gases from the group consisting of carbon monoxide and hydrogen and oxidizing gases from the group consisting of carbon dioxide and water vapor with a reducing potential equivalent to a ratio of carbon monoxide to carbon dioxide of not more than about 3 to 2 and not less than about 1 to 3 to selectively reduce nickel and cobalt to the metallic state and a substantial but controlled part of the iron amounting to not less than about 1% and less than about 15% of the iron in the ore to the metallic state; cooling the selectively reduced ore in a non-oxidizing atmosphere while maintaining said ore in a dry state; then treating the selectively-reduced, cooled and dry ore with carbon monoxide at not less than about 100° F. and not more than about 200° F. to volatilize most of the nickel in the ore as nickel carbonyl and a significant proportion of the iron in the ore as iron carbonyl to produce an iron to nickel ratio in the total volatilized carbonyls of not less than about 1 to 7 and not more than about 2 to 1; separating the mixed carbonyls from each other to permit production of metallic nickel and metallic iron; treating the carbonyl-extracted, dry material with dry chlorine gas at not less than about 100° F. and not more than about 200° F. to convert cobalt, residual nickel and a minimum amount of iron to chlorides; heating the dry, chlorinated material in air at above about 200° F. and below about 500° F. after the completion of said treatment with dry chlorine gas to decompose substantially all the iron chlorides formed; and water leaching to extract substantially all of the cobalt and residual nickel.

2. A process as described in claim 1 in which the reduction of the ore takes place at a temperature within the range of about 930° F. to about 1200° F.

3. A process for recovering nickel, cobalt and a controlled proportion of iron from lateritic nickel- and cobalt-bearing ores of the iron oxide type, containing less than about 10% magnesia and more than about 35% iron, which comprises reducing the ore at a temperature within the range of about 930° F. to about 1500° F. in a selectively reducing atmosphere containing reducing gases from the group consisting of carbon monoxide and hydrogen and oxidizing gases from the group consisting of carbon dioxide and water vapor with a reducing potential equivalent to a ratio of carbon monoxide to carbon dioxide of not more than about 3 to 2 and not less than about 1 to 3 to selectively reduce nickel and cobalt to the metallic state and a substantial but controlled part of the iron amounting to not less than about 1% and less than about 15% of the iron in the ore to the metallic state; cooling the selectively reduced ore in a non-oxidizing atmosphere to below about 200° F. while maintaining said ore in a dry state; then treating the selectively-reduced, cooled and dry ore with carbon monoxide at about atmospheric pressure and at not less than about 100° F. and not more than about 200° F. to volatilize up to about 90% of the nickel in the ore as nickel carbonyl and less than about 15% of the iron in the ore as iron carbonyl to produce an iron to nickel ratio in the total volatilized carbonyls of not less than about 1 to 7 and not more than about 2 to 1; separating the mixed carbonyls from each other to permit production of metallic nickel and metallic iron; treating the carbonyl-extracted, dry material with dry chlorine gas at the rate of from about 5 pounds to about 50 pounds of gas per ton of solids at not less than about 100° F. and not more than about 200° F. for less than about 30 minutes to convert cobalt, residual nickel and a minimum amount of iron to chlorides; heating the dry, chlorinated material in air, added in controlled amounts to prevent overheating of said dry material, at above about 200° F. and below about 500° F. for up to about 60 minutes after the completion of said treatment with dry chlorine gas to decompose substantially all the iron chlorides formed; and water leaching to extract substantially all of the cobalt and the residual nickel and leave a residue containing not more than about 0.02% nickel and not more than about 0.01% cobalt.

4. A process as described in claim 3 in which the reduction of the ore takes place at a temperature within the range of about 930° F. to about 1200° F.

5. A process for recovering nickel, cobalt and a controlled proportion of iron from lateritic nickel- and cobalt-bearing ores of the iron oxide type which comprises reducing the ore at a temperature within the range of about 930° F. to about 1500° F. in a selectively reducing atmosphere containing reducing gases from the group consisting of carbon monoxide and hydrogen and oxidizing gases from the group consisting of carbon dioxide and water vapor with a reducing potential equivalent to a ratio of carbon monoxide to carbon dioxide of not more than about 3 to 2 and not less than about 1 to 3 to selectively reduce nickel and cobalt to the metallic state and a substantial but controlled part of the iron to the metallic state; cooling the selectively reduced ore in a non-oxidizing atmosphere while maintaining said ore in a dry state; then treating the selectively-reduced, cooled and dry ore with carbon monoxide at not less than about 100° F. and not more than about 200° F. to volatilize most of the nickel in the ore as nickel carbonyl and a significant proportion of the iron in the ore as iron carbonyl to produce an iron to nickel ratio in the total volatilized carbonyls of not less than about 1 to 7 and not more than about 2 to 1; separating the mixed carbonyls from each other to permit production of metallic nickel and metallic iron; treating the carbonyl-extracted, dry material with dry chlorine gas at not less than about 100° F. and not more than about 200° F. to convert cobalt, residual nickel and a minimum amount of iron to chlorides; heat treating the dry, chlorinated material after the completion of said treatment with dry chlorine gas to decompose substantially all the iron chlorides formed; and water leaching to extract substantially all of the cobalt and the residual nickel.

6. A process as described in claim 5 in which the reduction of the ore takes place at a temperature within the range of about 930° F. to about 1200° F.

References Cited in the file of this patent

UNITED STATES PATENTS

| | | |
|---|---|---|
| 1,833,686 | Meyer | Nov. 24, 1931 |
| 2,212,459 | Simpson | Aug. 20, 1940 |
| 2,254,158 | Simpson | Aug. 26, 1941 |
| 2,400,098 | Brogdon | May 14, 1946 |

FOREIGN PATENTS

| | | |
|---|---|---|
| 396,933 | Great Britain | Aug. 17, 1933 |